Figure 1:
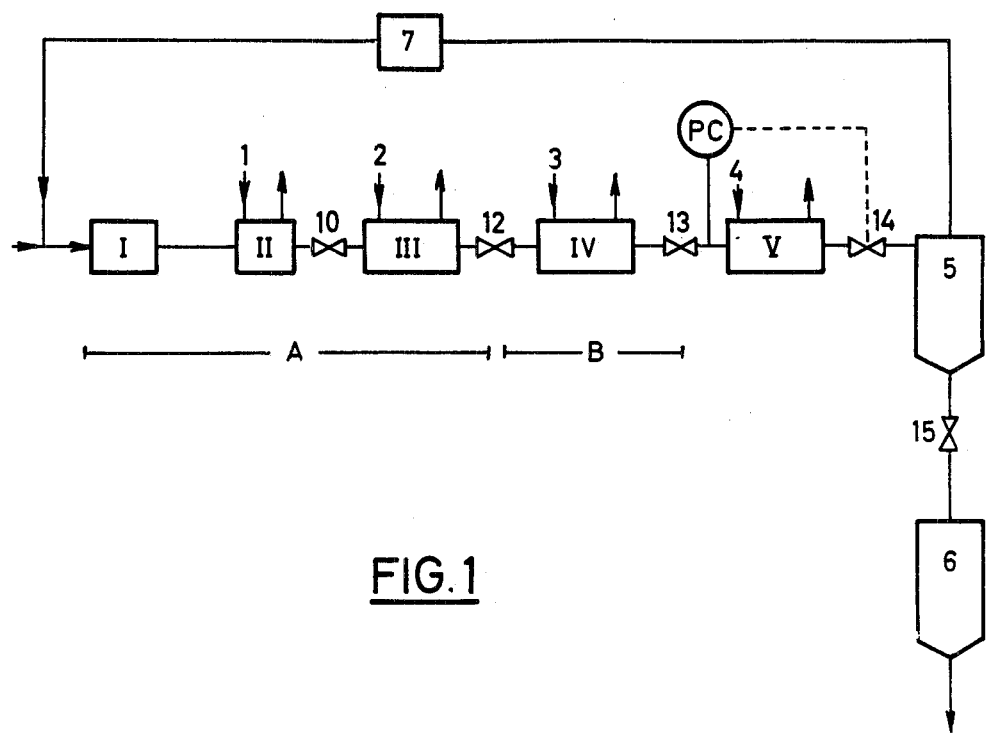

United States Patent [19]
Boettcher et al.

[11] 4,153,774
[45] May 8, 1979

[54] MANUFACTURE OF HIGH PRESSURE POLYETHYLENE

[75] Inventors: Klaus Boettcher, Wesseling; Heinrich G. Hoerdt, Bruehl; Wieland Zacher, Wesseling; Oskar Buechner, Dudenhofen, all of Fed. Rep. of Germany

[73] Assignee: BASF Aktiengesellschaft, Ludwigshafen, Fed. Rep. of Germany

[21] Appl. No.: 850,398

[22] Filed: Nov. 10, 1977

Related U.S. Application Data

[63] Continuation-in-part of Ser. No. 763,138, Jan. 27, 1977, abandoned.

[30] Foreign Application Priority Data

Feb. 17, 1976 [DE] Fed. Rep. of Germany ....... 2606114

[51] Int. Cl.² ........................... C08F 6/00; C08F 6/26; C08F 10/02
[52] U.S. Cl. .................................. 526/352.2; 526/64; 526/921

[58] Field of Search ................. 526/64, 352.2

[56] References Cited

U.S. PATENT DOCUMENTS 3,784,538  1/1974  Pfannmueller et al. ............... 526/64

FOREIGN PATENT DOCUMENTS 1047851 11/1966 United Kingdom ..................... 526/64

Primary Examiner—Alan Holler
Attorney, Agent, or Firm—Keil & Witherspoon

[57] ABSTRACT

A process for the high pressure polymerization of ethylene at elevated temperatures in a polymerization zone followed by transfer of the reaction mixture, through a cooling zone, into the separation zone. In this process, the pressure at the cooling zone outlet is periodically reduced briefly, at recurring intervals, these brief pressure reductions being independent of the pressure reductions in the polymerization zone. Using this process, the conversion in the polymerization unit can be increased and a more homogeneous ethylene polymer can be obtained.

4 Claims, 3 Drawing Figures

MANUFACTURE OF HIGH PRESSURE POLYETHYLENE

This application is a continuation-in-part of U.S. patent Application Ser. No. 763,138 filed Jan. 27, 1977, now abandoned.

The present invention relates to a process for the manufacture of ethylene polymers.

The ethylene polymers are obtained by homopolymerization of ethylene or copolymerization of ethylene with other compounds, copolymerizable with ethylene, in a continuously operated polymerization system at pressures of from 1,000 to 4,000 bars and at from 100 to 450° C., followed by transfer of the reaction mixture through a cooling zone into a high pressure product separation zone where the pressure is from 200 to 350 bars, the pressure prevailing in the cooling zone being lower than in the polymerization zone and the pressure in the cooling zone being from 50 to 500 bars higher than in the high pressure product separation zone.

Processes for the manufacture of ethylene polymers and copolymers by polymerizing ethylene, in the presence or absence of co-reactants, in polymerization systems such as tubular reactors or autoclaves, in the presence of initiators and in the presence or absence of chain transfer agents, stabilizers or solubilizers, at pressures above 1,000 bars and at from 100° to 450° C. have been disclosed. The subsequent isolation of the polymer from the reaction mixture is usually effected in a high pressure product separation zone, which is generally operated at pressures of from 200 to 350 bars, and in a downstream low pressure product separation zone, in which the pressure is a few bars.

The high pressure polymerization of ethylene is above all influenced by the strong exothermicity. In order that the reaction shall take place under favorable conditions, it is desirable to remove as much heat as possible from the polymerization zone, which consists of tubular reactors or autoclaves equipped with stirrers, because the achievable output is virtually directly dependent thereon. Viewed theoretically, the amount of heat which can be removed by means of a suitable coolant which flows over the reaction tubes in a jacketing tube is proportional to the heat conductivity of the ethylene reaction mixture, of the reactor tubes and of the coolant. In practice, however, it is necessary to take into account that the ethylene polymer formed adheres as a deposit to the inside of the walls of the reactor and substantially reduces the heat conducted toward the tube wall. The deposit detaches from time to time, migrates through the reactor and in this way interferes with the course of the polymerization. In extreme cases, such deposits which detach at irregular intervals may cause blockages. These result in severe and rapid pressure increases in the reactor, which in turn cause decomposition of the reaction mixture.

U.S. Pat. No. 2,852,501 discloses a method of operation of tubular reactors which counteracts the above disadvantages. In this method, the reactor is deliberately freed from wall deposits by periodically reducing the pressure by as much as 800 bars. In most cases this is done by reducing the pressure in the reactor from, for example, 2,000 bars to 1,200 bars at intervals of from 5 to 120 seconds. A pressure regulating valve, referred to as a let-down valve, located at the reactor outlet, is used for this purpose; through it, the pressure is briefly reduced by a fixed amount, i.e. the reaction zone is let down. At the same time, the pressure at the reactor inlet is measured. Thereafter, the actuator valve is shut until the reaction pressure has been re-established. The let-down valve is constructed as a regulating valve and, when the reaction pressure has been reached, holds the pressure constant until the next time that it is reduced. This method has essentially proved successful. However, it also has some disadvantages in that the greater part of the volume, or substantial amounts, of the ethylene introduced into the reaction chamber and as yet not containing any polymer are let down. This causes both energy losses and a lowering of the quality of the product formed.

U.S. Pat. No. 3,784,538 describes a process which very substantially avoids the lowering in quality, and losses of energy, caused by reducing the pressure. In addition, it permits the manufacture of a product of very high density and narrow molecular weight distribution in a polymerization unit employing predetermined operating conditions. In this process, the entire treatment zone, to be kept under pressure, of the reaction mixture is split at least once and brief pressure reductions are effected over only a part-zone, which comprises a certain distance of travel of the reaction mixture. In a preferred arrangement for carrying out the process, pressure-retaining valves are provided as pressure-regulating devices at the points of subdivision of the treatment zone and these valves are briefly actuated, in the sense of being closed, when the pressure is briefly reduced by means of a let-down valve located at the end of the reaction zone. According to a further characteristic of the process of U.S. Pat. No. 3,784,538, a polymerization unit possesses a plurality of pressure-reducing valves in order to maintain the pressure in several part-zones, each of these valves being allotted to one of a plurality of feed zones for the reaction mixture. These pressure-reducing valves which, when the let-down valve is opened, are actuated in the opposite sense, i.e. in the sense of being closed, furthermore advantageously respond with a short time delay. The pressure-retaining valve nearest the let-down valve is actuated first. In this process, and in polymerization units with tubular reactors, constructed on this principle, advantages are achieved in various respects, e.g. a higher effective pressure, better control of the course of the process, greater stability of the reaction, less pressure loss and improved product properties.

In the process of U.S. Pat. No. 2,852,501 and U.S. Pat. No. 3,784,538 the reaction mixture is flashed through a let-down valve in a product separation zone where the pressure is from 200 to 350 bars (cf. Chemical Engineering 73 (1966) (Dec. 19) 113–120).

Another method of product separation is described in German Published Application No. 2,120,624. In this method, pressures of from 500 to 1,000 bars are set up in the separation zone which directly adjoins the let-down valve. The separation zone consists of a heat exchanger, which acts as a cooling zone, and adjoining high pressure product separation zones. Cooling can, however, also be effected by direct addition of coolants. The pressure in the separation zone is controlled by means of a valve at the zone outlet.

In all processes referred to above, the pressure in the reactor is reduced periodically. In the conventional processes, cooling devices in the separation zone decrease in efficiency as the period of operation of the reactor increases. As a consequence, the temperatures of the reaction mixture in the high pressure product separation zones rise continuously after an operating period of two hours. In turn, this results in the proportion of ethylene converted to polymer having to be reduced when the period of operation is increased, by reducing the amount of initiator and chain transfer agent used. Accordingly, the conversion decreases if the essential properties of the ethylene polymer, e.g. melt index, density and molecular weight distribution, are to be kept constant. This focuses on the essential disadvantage of the methods described.

It has also been disclosed that high pressure product separation zones can be placed downstream of autoclave reactors and that little or no pressure reduction is employed with autoclave. Hence, autoclaves with downstream high pressure product separation zones also suffer from undesirable temperature rises.

It is an object of the present invention to provide a method which avoids the undesirable temperature rises.

We have found that this object is achieved, according to the invention, by providing, at the outlet from the cooling zone to the high pressure product separation zone, a pressure control valve by means of which the pressure in the cooling zone is reduced periodically and recurrently within from 0.1 to 10 seconds, these brief pressure reductions being independent of the pressure reductions to which the reaction mixture is subjected in the polymerization zone.

According to a further advantageous embodiment of the invention, the time interval between the end of one pressure reduction and the start of the next pressure reduction is in each case from 5 to 500 seconds.

The residence time of the reaction mixture in the cooling zone is advantageously from 5 to 200 seconds.

The term ethylene polymers embraces solid, waxy and oily polymers.

For the purposes of the invention, homopolymers and copolymers of ethylene are the ethylene homopolymers and copolymers which can be manufactured at pressures of from 1,000 to 4,000 bars and at from 100° to 450° C. All polymerization initiators and chain transfer agents conventionally used for the high pressure homopolymerization and copolymerization of ethylene may be employed for the purposes of the invention. Suitable compounds copolymerizable with ethylene are all those which can be copolymerized with ethylene under the stated pressure conditions. Examples of such compounds are vinyl esters, e.g. vinyl acetate and vinyl propionate, esters of acrylic acid, e.g. butyl acrylate, esters of methacrylic acid, acrylonitrile, acrylamide, acrylic acid or vinyl ethers. Advantageous catalysts to use are oxygen, peroxides, e.g. benzoyl peroxide, or azo compounds, e.g. azo-isobutyronitrile. High energy irradiation may also be used to initiate the polymerization.

The invention may be implemented using the conventional continuously operated high pressure polymerization systems. Polymerization zones are to be understood as being the conventional tubular reactors and stirred autoclaves. Tubular reactors are vessels whereof the ratio of length to diameter of the pressure-resistant tubes is from 10,000:1 to 60,000:1. Autoclave reactors are pressure-resistant vessels whereof the length to diameter ratio is from 30:1 to 2.5:1. In order to achieve thorough mixing of the reaction mixture and good distribution of the heat generated, the autoclaves are fitted with stirrers. Information on processes using tubular reactors or autoclave reactors is to be found, for example, in Ullmanns Encyklopädie der technischen Chemie, 3rd edition, volume 14 (1963), pages 137–148.

Following the polymerization, the reaction mixture coming from the polymerization system, i.e. from the tubular reactor or autoclave reactor, is flashed in a cooling zone. For this purpose, a let-down valve located at the reactor outlet is used; by means of this valve the pressure in the polymerization system can be reduced briefly, i.e. the reaction zone can be let down. The cooling zone used is an apparatus which can be operated as a cooling device, i.e. an after-cooler. Preferably, this cooling zone is a pressure-resistant tube surrounded by a jacket through which passes a coolant. In this cooling tube, the reaction mixture which has left the reactor can be cooled to a temperature lower than the temperature prevailing in the reactor, i.e. in the polymerization zone. In general, the temperature in the cooling zone, e.g. in the cooling tube described above, is from 200° to at most 320° C. The pressure in this cooling zone is lower than in the polymerization zone. The pressure in the cooling zone is from 250 to 850 bars and from 50 to 500 bars higher than in the high pressure product separation zone.

The reaction mixture is then passed into a high pressure product separation zone or high pressure separator, where the prevailing pressure is from 50 to 500 bars lower than in the upstream cooling zone (cooling tube). The pressure in this separation zone is from 200 to 350 bars. In the separation zone, the ethylene polymer obtained in the reactor is separated from the unpolymerized monomers. From the high pressure separator, the polymer, still containing small amounts of monomer, is passed into a low pressure product separation zone or low pressure separator. In the latter, the prevailing pressure is usually less than 10 bars, as a rule from 1 to 10 bars.

According to the process of the invention, the pressure in the cooling zone is reduced periodically, at the outlet from the cooling zone to the high pressure separation zone, for a duration of at most 10 seconds, these brief pressure reductions being independent of the pressure reductions to which the reaction mixture is subjected in the polymerization zone. For this purpose a control valve is provided at the outlet of the cooling zone which is located between the let-down valve at the reactor outlet and the high pressure product separation zone. Its function is to periodically reduce the pressure in the cooling zone. The pressure reduction at the cooling zone outlet is advantageously from 50 to 500 bars, preferably from 100 to 150 bars, and may last in each case from 0.1 to 10 seconds, preferably from 0.1 to 1.5 seconds. The duration of a pressure reduction is to be understood as the period, in seconds, for which a single pressure reduction is effected, i.e. for which the let-down valve at the end of the cooling zone, leading to the high pressure product separation zone, is opened. The decisive factor is that these brief pressure reductions are periodically repeated. These time intervals between the end of one pressure reduction and the start of the next pressure reduction amount in each case to from 5 to 500 seconds.

The residence time of the reaction mixture in the cooling zone is advantageously set to from 5 to 200 seconds, preferably from 10 to 20 seconds. The residence time is defined as the ratio of the throughput of reaction mixture, in unit volumes per unit time, to the volume of the cooling zone or of the cooling tube.

It is an advantage of the process of the invention that by following this method the temperature in the cooling zone, and hence also in the high pressure product separation zone, i.e. the high pressure separator, can be reduced significantly. Consequently, the conversion in the polymerization unit can be increased and a more homogeneous product can be obtained.

The polymerization systems used in carrying out the process of the invention will now be described in relation to FIGS. 1, 2 and 3 of the accompanying drawings.

FIG. 1 shows a tubular reactor with a reaction zone.

The compressor I feeds a mixture of ethylene, with various additives required for the polymerization, under high pressure into the part II of the apparatus, which serves as a buffer vessel and preheater, and in which the pulsation caused by the compressor is damped and the reaction mixture is heated up. The reaction mixture passes to the starter reactor III via an on-off valve 10. In this part-zone A of the total tubular reactor, the polymerization starts as a result of sufficient heat supplied by a heating medium. The mixture then passes through the pressure-reducing valve 12 to the actual reactor IV, which transmits its heat of reaction through the tube wall. The pressure-reducing valve 12 operates in such a way as to keep the pressure in parts II and III of the apparatus constant at all times. The reactor IV, in the part-zone B of the tubular reactor which is subjected to brief pressure reductions, is cooled with a coolant, the temperature of which is below the temperature of the gas mixture at the inlet of the reactor IV. The let-down valve 13 normally keeps the pressure in the reactor IV constant at the desired value. The brief pressure reductions form part of the functioning of the let-down valve 13. The reaction product leaving the reactor IV is flashed in the aftercooler V (or cooling zone). The latter is cooled by means of a coolant which is at a temperature below the temperature of the reaction mixture flowing through the cooling zone, and consists of pressure-resistant tubes surrounded by a jacket through which the coolant passes. It is provided with a pressure control valve 14 at its outlet, the function of this valve being to reduce the pressure in the aftercooler periodically. The pressure is controlled by means of the pressure-signalling device PC, which controls the valve 14 with the aid of the requisite control means. From the aftercooler, the reaction mixture is let down, through this control valve, into the high pressure separator 5. There, the polyethylene is separated from the unconverted ethylene. The polymer, obtained as a melt, passes via the valve 15 to the low pressure separator 6 and from there is processed further by conventional methods. The gas from the high pressure separator 5 is cooled and purified by means of a unit 7 designed for the purpose and not shown in more detail, and is recycled to the compressor I. Heating medium or coolant is introduced at the inlets marked 1, 2, 3 and 4.

Figure 2:
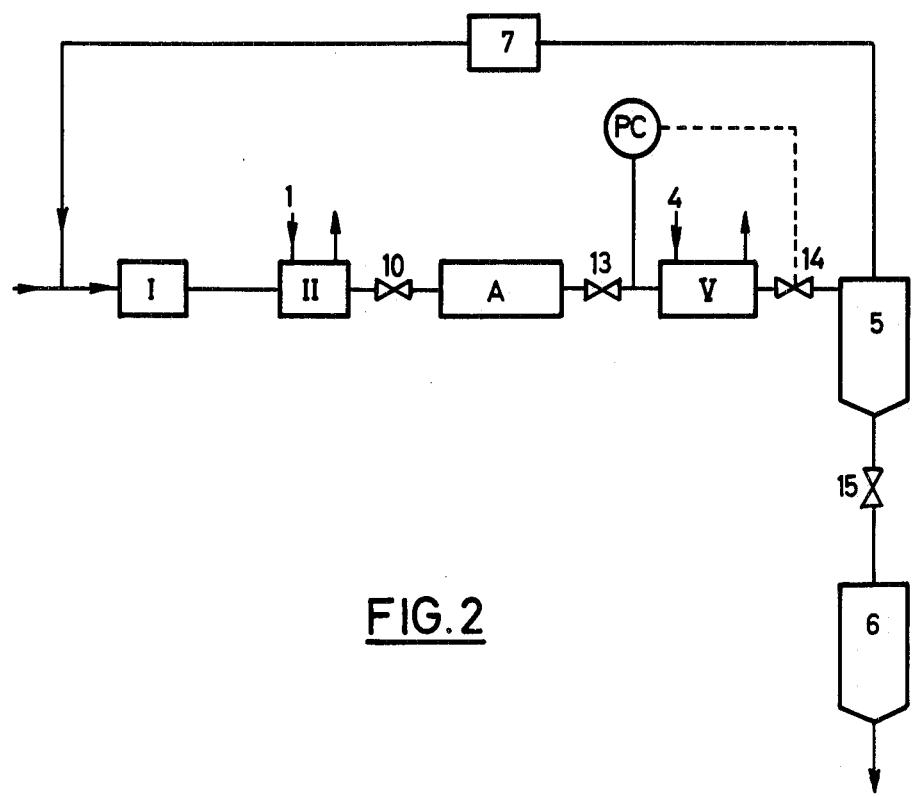

FIG. 2 shows a polymerization reactor which has an autoclave A, equipped with a stirrer, in place of the reactors III and IV. The pressure-reducing valve 12 is located at the autoclave outlet and is followed by the aftercooler V, pressure-signalling device PC and control valve 14. All further parts of the installation, the high pressure product separator 5 and the low pressure product separator 6 are identical with those shown in FIG. 1. Heating medium and coolant are introduced at the inlets 1 and 4.

Figure 3:
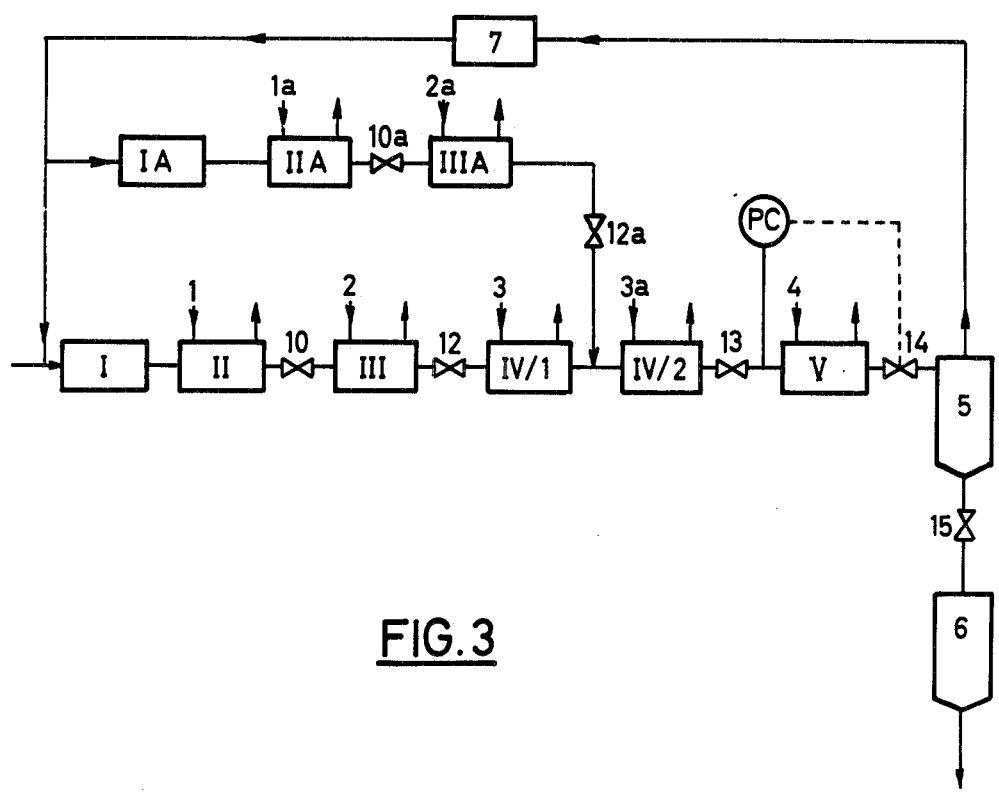

FIG. 3 shows a tubular reactor comprising 2 parts each of type I, II, III and IV, marked I, IA, II, IIA, III, IIIA, IV/1 and IV/2. The corresponding valves are marked 10, 12, 13, 14, 10a and 12a. Its essential difference from the reactor shown in FIG. 1 will be described briefly. The reaction mixture leaving the reaction zone IV/1 is mixed with ethylene which contains initiator and has been compressed and preheated as it travels through IA, IIa and IIIA. In the zone IV/2, a further polymerization reaction takes place as a result of the renewed addition of initiator, referred to above. The parts 13, V, PC, 14, 5, 15, 6 and 7 of the apparatus perform the functions already described in connection with FIG. 1. Heating medium and coolant are introduced at 1, 1a, 2, 2a, 3, 3a and 4.

The following procedure is employed with the reactor shown in FIG. 1. The reaction pressure in reactors II, III and IV may be set to a value from 1,000 to 4,000 bars. The pressure reductions effected by means of valve 13 are from 100 to 1,000 bars; they take place at intervals of from 0.5 minute to 500 hours and last from 0.1 to 10 seconds. The pressure in the after-cooler V is set by means of the valve 14 so as to be from 50 to 500 bars above the pressure in the high pressure product separator 5 and is periodically reduced by means of valve 14 by from 500 to 50 bars. The pressure reductions take place at intervals of from 5 to 500 seconds and last from 0.1 to 10 seconds. The residence time of the reaction mixture in the after-cooler is from 5 to 200 seconds.

In the reactor shown in FIG. 2, the following conditions are employed. The pressure in autoclave A is set to from 1,000 to 4,000 bars. The pressure reductions effected by means of valve 12 are from 20 to 300 bars; they take place at intervals of from 0.5 minute to 500 hours. The pressure in the aftercooler V is set by means of the valve 14 so as to be from 50 to 500 bars above the pressure in the high pressure product separator 5 and is periodically reduced by means of valve 14 by from 500 to 50 bars. The pressure reductions take place at intervals of from 5 to 200 seconds and last from 0.1 to 10 seconds. The residence time of the reaction mixture in the aftercooler is from 5 to 200 seconds.

The conditions in the reactor shown in FIG. 3 correspond to those of the reactor shown in FIG. 1.

EXAMPLE 1

Per hour, 20,000 kg of ethylene, containing 300 g of oxygen and 44 kg of propionaldehyde, are introduced continuously into a tubular reactor. The mixture is under a pressure of 3,000 bars. At intervals of 200 minutes, the pressure is reduced to 2,800 bars for a period of 1.5 seconds. After a residence time of 60 seconds, the reaction mixture has reached a temperature of 330° C. After a further 20 seconds, 10,000 kg of ethylene, containing 350 g of oxygen and 20 kg of propionaldehyde, are added. After a further 40 seconds, the reaction mixture, after having first returned to 330° C., is let down via the actuator valve into the aftercooler at 500 bars. After 15 seconds, the reaction mixture passes into the high pressure product separator, where it has a temperature of 290° C. and a pressure of 280 bars. After two hours' operation the amout of initiator introduced is reduced to 260 g of oxygen per hour and the amount of propionaldehyde to 40 kg per hour. 8,000 kg/hr of polyethylene having a melt index of (MFI) 4 g/10 min (according to DIN 53,479) and a density of 0.924 g/cm$^3$ (according to DIN 53,735) are obtained.

EXAMPLE 2

The procedure followed is as in Example 1 but in contrast to the latter, the reaction mixture is let down to 500 bars in the aftercooler and the amount of initiator and chain transfer agent is kept constant for the whole period of operation. This pressure is reduced to 400 bars for a duration of 0.3 second at intervals of 10 seconds, by means of the valve at the aftercooler outlet. After a residence time of 15 seconds, the reaction mixture leaves the aftercooler via the valve and passes into the high pressure product separator where the temperature assumes a value of 271° C. at a pressure of 280 bars. 8,500 kg/hr of polyethylene having a MFI of 4 g/10 min and a density of 0.924 g/cm$^3$ are obtained.

EXAMPLE 3

Per hour, 5,000 kg of ethylene, 130 g of tert.-butyl perpivalate, 180 g of tert.-butyl perisononanate and 10 kg of propionaldehyde are introduced continuously into an autoclave equipped with a stirrer. The pressure in the autoclave is kept at 2,000 bars and is periodically reduced to 1,970 bars for a duration of 0.3 second, at intervals of 300 minutes. The reaction temperature is 270° C. After a residence time of 60 seconds, the reaction mixture is let down into the after-cooler, at 500 bars, by means of the let-down valve. After a residence time of 20 seconds, it is let down to a pressure of 280 bars in the high pressure product separator. The temperature in the latter assumes a value of 282° C. After two hours' operation the amount of initiator introduced is reduced to 122 g tert.-butyl perpivalate and 163 g tert.-butyl perisononanate per hour and the amount of propionaldehyde to 8.5 kg per hour.

860 kg/hr of polyethylene having an MFI of 7 g/10 min and a density of 0.922 g/cm$^3$ are thus obtained.

EXAMPLE 4

Exactly the same conditions as those described in Example 3 are set up continuously in the autoclave. However, in contrast to Example 3, different conditions are maintained in the aftercooler zone and the amount of initiator and chain transfer agent is kept constant for the whole period of operation. The pressure is kept at 500 bars and is reduced to 400 bars for a duration of 0.3 second at intervals of 10 seconds by means of the valve fitted at the aftercooler outlet. The mixture let down through this valve to 280 bars into the high pressure product separator is at 264° C.

955 kg/hr of polyethylene having an MFI of 6.8 g/10 min and a density of 0.922 g/cm$^3$ are thus obtained.

EXAMPLE 5

Exactly the same conditions as those described in Example 3 are set up in the autoclave. In contrast to Example 3, the pressure in the aftercooler is kept constant at 280 bars. The residence time of the reaction mixture in the aftercooler is 20 seconds. The temperature in the high pressure product separator assumes a value of 281° C. at 280 bars.

870 kg/hr of polyethylene having an MFI of 7.2 g/10 min and a density of 0.9215 g/cm$^3$ are thus obtained.

We claim:

1. A process for the continuous manufacture of an ethylene polymer by homopolymerization of ethylene or copolymerization of ethylene with one or more other monomers copolymerizable with ethylene, in a polymerization zone at from 1,000 to 4,000 bars and from 100° to 450° C., followed by transfer of the reaction mixture through a cooling zone into a high pressure product separation zone where the pressure is from 200 to 350 bars, the pressure prevailing in the cooling zone being lower than in the polymerization zone but being from 50 to 500 bars higher than in the high pressure product separation zone, wherein the pressure in the cooling zone is reduced periodically and recurrently for a duration of from 0.1 to 10 seconds at the outlet from the cooling zone to the high pressure product separation zone, these brief pressure reductions being independent of the pressure reductions to which the reaction mixture is subjected in the polymerization zone.

2. The process of claim 1, wherein the magnitude of the pressure reductions in the cooling zone is from 50 to 500 bars.

3. The process of claim 1, wherein the time interval between the end of one pressure reduction and the start of the next pressure reduction in the cooling zone is in each case from 5 to 500 seconds.

4. The process of claim 1 or 3, wherein the residence time of the reaction mixture in the cooling zone is from 5 to 200 seconds.

* * * * *